Patented Apr. 16, 1929.

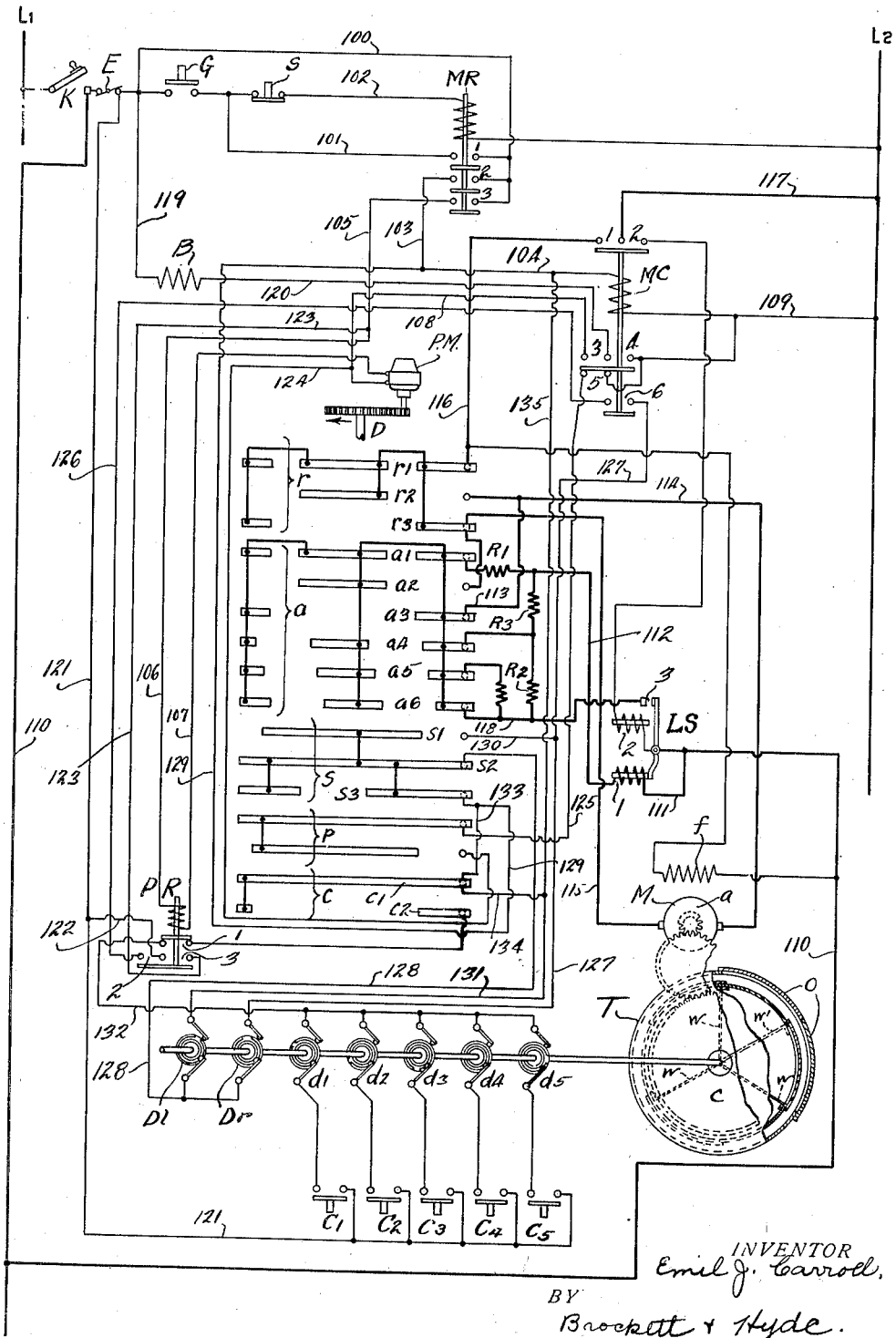

1,709,059

UNITED STATES PATENT OFFICE.

EMIL J. CARROLL, OF NORWOOD, OHIO, ASSIGNOR TO THE AMERICAN LAUNDRY MACHINERY COMPANY, OF CINCINNATI, OHIO.

MOTOR-CONTROL MECHANISM.

Application filed July 16, 1926. Serial No. 122,910.

This invention relates to controllers for motor driven devices and while not limited thereto is particularly applicable to controllers for motor driven washing machines and the like. Such controllers are ordinarily adapted to provide for normal operation of the washing machine in automatically controlled cycles including periodic reversal and acceleration and for bringing the machine to a stop when desired in positions for loading and unloading.

In modern washing machines of the multiple compartment type, the cylinder must be stopped successively with the several compartment walls in alignment with the loading and unloading platform, and controllers have been devised which provide for such multiple position stopping as required in addition to the normal automatic stop.

One type of such controller provide means for initiating by hand the normal stopping of the cylinder in a single or prime position, and thereafter automatically delaying the actual stopping of the cylinder pending the coincidence of certain predetermined conditions such as operation of the cylinder at a certain speed and in a certain instantaneous position depending upon direction; and for thereafter advancing the cylinder in automatically limited steps successively to the remaining loading and unloading positions. In such an arrangement, after initiating the prime stopping of the cylinder by presetting the controller to stop the machine upon coincidence of the predetermined conditions, some little time elapses before the conditions are fulfilled and the cylinder actually stopped. Moreover, such a controller usually involves a contactor drum driven by a pilot motor and controlling the numerous circuits including those of the cylinder motor; which after stopping the motor is continued in motion by the pilot motor to a position to effect restarting circuits for the motor, adapted to be completed by actuation of the starting or go-ahead button, and at the same time to complete the circuits of the compartment stop button.

In order to eliminate the possibility of crossing circuits as by malfeasance of the control buttons it is desirable to provide means for making the compartment stop buttons ineffective pending stopping of the contactor drum.

It is the object of this invention to maintain the compartment stop buttons in an open circuit at all times during actuation of the contactor drum and for this purpose I have provided a relay in the circuit of the pilot motor which drives the contactor drum whereby the compartment stop circuits may be energized only upon de-energization of the pilot motor circuit. The details of my invention will be apparent from the following description in connection with the schematic drawing in which $L^1$ and $L^2$ are the line wires providing the source of power supply for the reversing motor M the armature $a$ of which is geared directly to the driven machine part which as disclosed is a cylinder C of a washing machine. The cylinder shown is mounted to be revolved in a tub T provided with suitable closed openings O whereby the cylinder may be loaded and unloaded; the cylinder as disclosed being divided by radially and longitudinally extending division walls $w$ into three compartments; the position of the cylinder shown being the unloading position for the compartment adjacent the opening referred to and the loading position of the cylinder being indicated by the compartment wall $w'$ shown in dot dash lines; there being therefore six stopping positions of the cylinder. On a spindle driven with the cylinder are a number of drum switches $Dl$ and $Dr$ provided with dead points corresponding with right and left hand actuation of the cylinder and adapted for coincidental opening of a circuit to be described, to effect stopping of the cylinder in the prime position; and $d^1$, $d^2$, $d^3$, $d^4$ and $d^5$ in the compartment stop circuits adapted to stop the cylinder selectively in the remaining five positions subsequent to its automatic stopping in the prime position. A contactor drum D driven by a pilot motor P. M is provided with a number of contact segments and rings; $r$ in the motor reverse circuit; $a$ in the motor accelerating circuits; $s$ in a circuit dependent upon full speed operation of the motor, the functions of this portion of the drum being to make stopping of the cylinder in the prime position subject to its full speed condition; $p$ in the pilot motor circuit and $c$ in the compartment stop circuits; all to be described. The controller is provided with the usual line switch K; emergency switch E, start or go-ahead button G; stop button S for presetting the controller to stop the cylinder in its prime position; and the compartment stop buttons C1, 2, 3, 4 and 5 for subsequently advancing the cylinder through the several remaining loading and unloading positions. A cylinder brake B is provided, spring applied and electrically released by energization of the coil indicated. In the stop button circuit is a main relay MR; in the pilot motor circuit is a pilot relay PR; adapted for primary control of the cylinder motor M is a main contactor MC and a lockout switch LS.

It is believed that the specific arrangement and circuits can best be set forth by a description of the operation of the machine. Assuming therefore, the switches K and E closed, the cylinder stationary and the brake applied, the buttons G, S and C1, 2, 3, 4 and 5 and the automatic switches MR, PR, MC and LS being normally spring or gravity maintained in the positions indicated to effect the contacts shown.

To start the machine the operator momentarily depresses the go-ahead button G which instantly energizes the coil of the main relay MR to close the main relay contacts $MR^1$, $MR^2$, and $MR^3$.

$MR^1$ completes a circuit to maintain energization of the coil MR; the circuit being from $L^1$ through switches K and E, line 100, contacts $MR^1$, line 101, stop button S, line 102, through the MR coil to $L^2$.

Closing of contact $MR^2$ energizes the coil of the main contactor MC, the circuit being from line 100, as before through $MR^2$, line 103, line 104, and the main contactor coil and through line 109 to $L^2$.

Closing of contact at $MR^3$ completes the first pilot motor circuit, starting the pilot motor to rotate the drum D in the direction indicated by the arrow shown; the circuit being through line 100 as before, through contact $MR^3$, line 105, line 106, the coil of the pilot relay PR line 107, pilot motor, line 108, across the now closed contacts 3 and 4 of the main contactor and through the line 109 to $L^2$.

Energization of the coil of the main contactor MC closes the contacts $MC^1$ to $MC^6$ of the main contactors.

The contact at $MC^1$ establishes a motor starting circuit; from $L^1$ through switch K, lines 110 and 111, series coil LS of the lockout switch, line 112, starting resistance $R^1$, acceleration contacts $a^1$, $a^3$, line 113, line 114, through the motor armature Ma, line 115, reverse contact $r^3$ and $r^1$, line 116, contact $MC^1$ through line 117 and to $L^2$; thus starting the motor with starting resistance in circuit.

The resistance $R^3$ is next inserted in parallel with $R^1$ by contactor $a^4$. When the calibrated shunt winding $LS^2$ of the lockout switch overcomes the series winding $LS^1$, contact is made at $LS^3$, adding the parallel resistance $R^2$ into the motor circuit, and finally by contact at $a^5$ all of the starting resistances are included in parallel. The next step is effecting of contact at $a^6$ to complete a circuit which bypasses all of the resistances, the motor then being across the line.

Closing of contact $MC^2$ completes a circuit from line 110 as described through the shunt winding LS, line 117 to $L^2$, energizing the shunt coil of the lockout switch, the action of which has been described.

Closing of contact $MC^3$ completes a pilot motor circuit including $MR^3$ as has been described.

Closing of contact $MC^4$ energizes the release coil of the brake B, the circuit being from $L^1$ through switches K and E, line 119, through the brake coil 120, contact $MC^4$, line 109, to $L^2$.

Contact at $MC^5$ establishes a pilot motor circuit after de-energization of the main contactor coil, the circuit being as follows: from $L^1$ through switches K and E, lines 121 and 122, across the closed contact $PR^3$, line 123, line 106, coil of the pilot relay, line 107, through the pilot motor, line 124, through the segments p on the drum, line 125, contact $MC^5$, line 109 to $L^2$.

Contact at $MC^6$ establishes a maintaining circuit for the main contactor coil, the circuit being from $L^1$ through switches K and E, line 121, 122, contact $PR^2$, line 126, contact $MC^6$, line 127, drum switch Dr, line 128, drum contacts $s^2$, $s^3$, line 129, line 104, the main contactor coil, line 109, to $L^2$.

Contact $MC^6$ is in another maintaining circuit as follows: from $L^1$, through switches K and E, line 121, 122, contact $PR^2$, line 126, contact $MC^6$, line 127, line 130, drum switch contacts $s^1$, $s^2$, line 128, drum switch Dl, line 131, line 135, line 104, main contactor coil, line 109 to $L^2$. It will be noted that each of these contactor maintaining circuits include elements of the drum segments s and either one of the other of the drum switches Dr or Dl, making de-energization of the coil of the main contactor dependent upon the speed of the motor but independent of its direction of rotation.

Energization of the pilot relay coil opens the contact $PR^1$ and closes $PR^2$ and $PR^3$.

Opening of the contact $PR^1$ opens the circuits otherwise to be closed by the compartment stop buttons $C^1$ to $C^5$ subject to closing of their respective drum switches $d^1$ to $d^5$, these circuits being as follows: from $L^1$ through switches K and E, line 121, in parallel through the stop buttons $C^1$ to $C^5$ and their respective corresponding drums $d^1$ to $d^5$, line 132, contact $PR^1$ contacts $c^2$ and $c^1$ of the contactor drum, and thence to $L^2$ through the main contactor coil by either of two paths; one, line 133, line 129, line 104 and two, through line 134, line 135, line 104. (Thus the compartment stop buttons are ineffective during the energization of the pilot relay coil and therefore during motion of the drum switch.)

Contact $PR^2$ is in a maintaining circuit with the contact $MC^6$ of the main contactor which has been described.

Contact $PR^3$ is in two pilot motor maintaining circuits: from $L^1$ through switches K and E, line 121, line 122, $PR^3$, line 123, line 106, coil PR, line 107, pilot motor (1) through line 108, $MC^3$, $MC^4$, line 109 to $L^2$, and (2) line 124, drum segments $p$, line 125, contact $MC^5$, line 109 to $L^2$.

The washing cylinder being under way it is automatically periodically reversed by reversal of the motor M accomplished by the contact segments $r$ of the drum, the pilot motor maintaining the drum in rotation at a constant speed. The drum segments $r$ being arranged as indicated to effect periodical reversal of the direction of current flow through the armature of the motor.

It will be noted that there are three maintaining circuits for the main contactor coil, one through the main relay contact $MR^2$ and two and three through the contact segments $s$ of the drum, and one or the other of the drum switches $Dl$ or $Dr$ respectively. There are also three maintaining circuits for the pilot motor, one through contact $MR^3$, two including the contacts $MC^3$ and $MC^4$ and three, including $MC^5$ and the pilot motor segments $p$ of the drum.

To stop the machine in the prime position the operator momentarily depresses the stop button S which immediately de-energizes the main relay MR and opens the contacts MR1, 2 and 3. Opening of the contact $MR^2$ opens the first of the maintaining circuits for the coil of the main contactor MC. The main contactor however, does not open, owing to the second and third maintaining circuits for this coil, through the drum switches $Dl$ and $Dr$ respectively as described.

Opening of the contact at $MR^3$ opens the first maintaining circuit for the pilot motor but the pilot motor also continues running owing to the second and third pilot motor maintaining circuits described. The motor and cylinder therefore continue in operation until one or the other of the drum switches $Dl$ or $Dr$ open their respective maintaining circuits for the main contactor coil coincidentally with an opening of the main contactor circuit by the contact segments, $s$, at which time power is shut off from the motor M, the brake B is applied, and the cylinder is brought to a stop in its prime position for unloading its prime compartment, the opening segments of the drum switches $Dl$ and $Dr$ being properly timed for the purpose.

As the main contactor coil is de-energized the pilot motor maintaining circuit which includes the contacts $MC^3$ and $MC^4$ is broken, but at the same time contact is made at $MC^5$ in the pilot motor maintaining circuits which include the drum segments $p$. The pilot motor therefore, continues in operation until this circuit is opened by the drum, the opening being properly timed so that the drum will stop in a motor re-starting position. As the pilot motor circuit is opened contact is made upon the segments C of the drum to cut the compartment stop switches $C^1$ to $C^5$ into their circuits; these switches having been maintained ineffective as has been described by the pilot relay up to this time.

To advance the cylinder to the next desired loading or unloading position it is only necessary for the operator to depress the proper compartment stop button C. For example to advance the cylinder to the next immediate stopping position, the button $C^1$ is depressed, energizing the main contactor coil to start the motor, the circuit being from $L^1$ through switches K and E, line 121, compartment stop button $C^1$, cylinder switch $d^1$, line 132, contact $PR^1$, drum segments $C^2$, $C^1$, line 134, line 135, through the main contactor coil and by way of line 109 to $L^2$. Closing of the main contactor establishes the brake release circuit as before and starts the motor, which, since the drum is now stationary, advances the cylinder at its first or slow speed.

Obviously as soon as the cylinder has advanced sufficiently to uncover the properly timed dead spot upon the cylinder switch $d^1$, the main contactor coil circuit is broken, and the motor stopped, with the brake applied in the desired position.

Further timed progression of the cylinder is similarly effected by depressing successively the remaining compartment stop buttons.

It will be noted that the pilot relay maintains the compartment stop buttons ineffective by opening their circuits at $PR^1$, pending stopping of the pilot motor with the drum in the position indicated, and that hence the compartment stop buttons are ineffective not only pending stopping of the cylinder, but also until the drum is safely preset to insure restarting of the motor under low speed conditions.

What I claim is:

1. In a machine of the class described, a tub having a door, a cylinder rotatably mounted in said tub and having a plurality of compartments each having a door registerable with said tub door, a machine motor arranged to rotate said cylinder, control means for said motor comprising a contactor drum arranged for control of the motor accelerating circuits and including low and high speed segments, a pilot motor arranged to drive said drum, means including contacts on said drum arranged to stop said machine motor with one of said compartment doors in registry with said tub door, contacts on said drum arranged to stop said pilot motor at low speed drum position after stopping of said cylinder in registered position, and means for subsequently actuating said machine motor under conditions of reduced speed to effect movement of said cylinder to another position, and including hand actuable switches in circuit with low speed drum segments, and means controlled by the pilot motor circuit for rendering the switches ineffective when said pilot motor circuit is energized.

2. In a machine of the class described, a tub having a door, a cylinder rotatably mounted in said tub and having a plurality of compartments each having a door registerable with said tub door, a machine motor arranged to rotate said cylinder, control means for said motor comprising a contactor drum arranged for control of the motor accelerating circuits and including low and high speed segments, a pilot motor arranged to drive said drum, means including contacts on said drum arranged to stop said machine motor with one of said compartment doors in registry with said tub door, contacts on said drum arranged to stop said pilot motor at low speed drum position after stopping of said cylinder in registered position, and means for subsequently actuating said machine motor under conditions of reduced speed to effect movement of said cylinder to another position, and including hand actuable switches in circuit with said low speed drum segments, and means for rendering said switches ineffective for starting the machine motor dependent upon positioning of said drum to insure said reduced speed operation of the machine motor, said last named means comprising a relay controlling the circuits of said switches and dependent upon de-energization of the circuit of said pilot motor.

3. In a machine of the class described, a tub having a door, a cylinder rotatably mounted in said tub and having a plurality of compartments each having a door registerable with said tub door, a machine motor arranged to rotate said cylinder, control means for said motor comprising a contactor drum arranged for control of the motor accelerating circuits and including low and high speed segments, a pilot motor arranged to drive said drum, means including contacts on said drum arranged to stop said machine motor with one of said compartment doors in registry with said tub door, contacts on said drum arranged to stop said pilot motor at low speed drum position after stopping of said cylinder in registered position, and means for subsequently actuating said machine motor under conditions of reduced speed to effect movement of said cylinder to another position, and including hand actuable switches in circuit with said low speed drum segments, and means for rendering said switches ineffective for starting the machine motor dependent upon positioning of said drum to insure said reduced speed operation of the machine motor, said last named means comprising a relay having an actuating coil in the circuit of said pilot motor and being arranged to open the circuits of said switches during operation of said pilot motor.

In testimony whereof I hereby affix my signature.

EMIL J. CARROLL.